Dec. 1, 1959 C. A. SEGERSTROM 2,915,747
ECHO RANGING SYSTEM
Filed Oct. 5, 1950
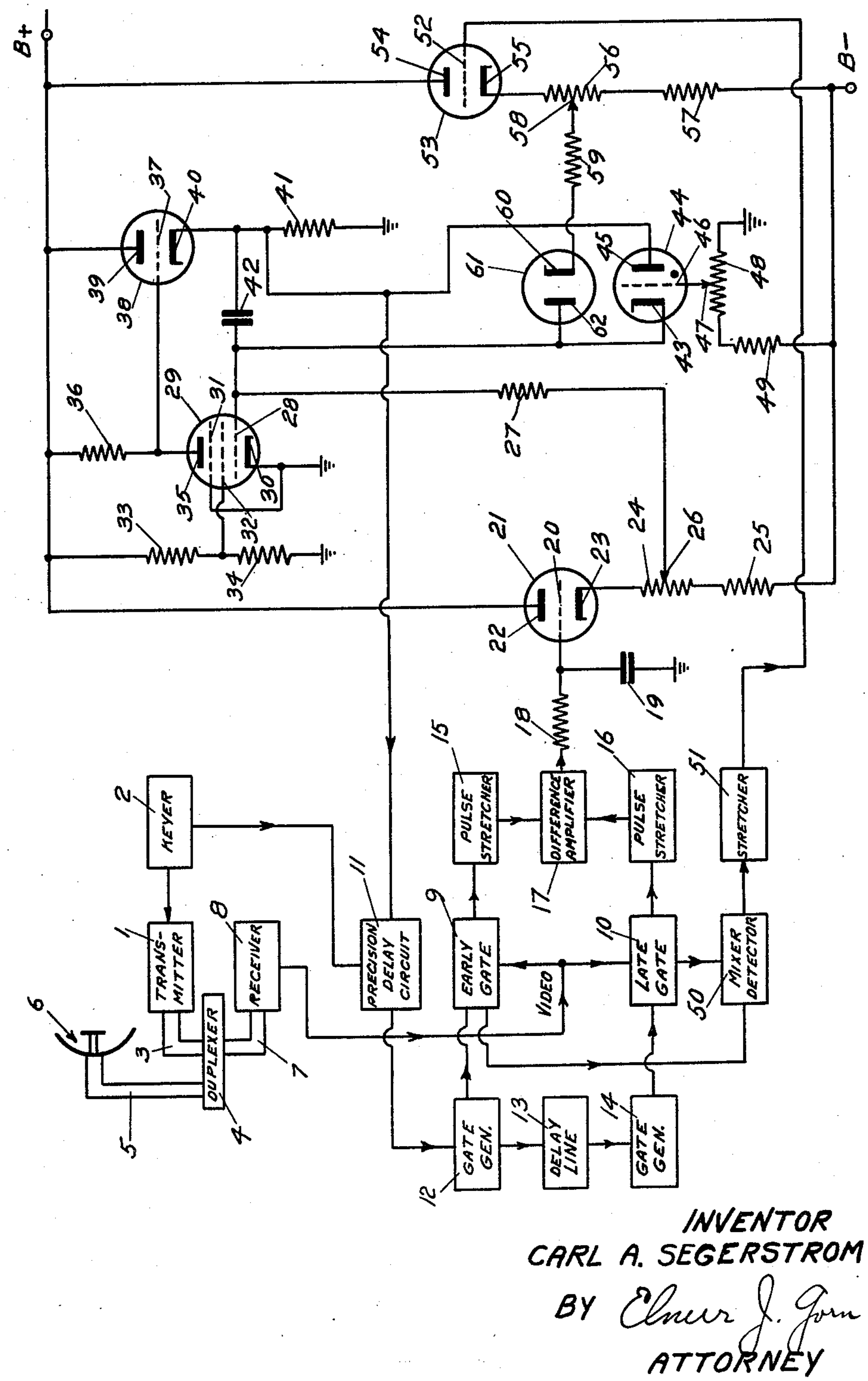
INVENTOR
CARL A. SEGERSTROM
BY Elmer J. Gorn
ATTORNEY United States Patent Office 2,915,747

Patented Dec. 1, 1959

2,915,747

ECHO RANGING SYSTEM

Carl A. Segerstrom, Winchester, Mass., assignor to Raytheon Company, a corporation of Delaware Application October 5, 1950, Serial No. 188,528

3 Claims. (Cl. 343—7.3)

This invention relates to a control system and more particularly to a control system adapted to operate in an object-detecting system which automatically searches for objects and then tracks the position of an object upon discovering the same.

In object-locating systems as, for example, radar systems, signals are emitted from a source and reflected from objects. The reflected signals are then compared with the emitted signals to determine the distance of the object from the source.

It is well known that the position of an object may be tracked by the use of pulse-echo radars where a pair of gates allows the passage of a small portion of the video return signal. These gates are delayed in time from each other by a small predetermined amount, and the video information passed by these gates is then compared. When an object reflection signal appears in the gates, an output signal from the gates can be had by comparison of the relative amplitude of the gate outputs, which will indicate the time position of the object signal relative to the gates. This output signal may be then used to control the time at which the gates open such that they will track the object.

In the absence of object signals, an externally generated signal may be applied to the system to control the position of the gates, and by varying the amplitude of this signal the gates may be made to search over a wide range of object distances.

In order for the system to track on an object signal, the external signal must be disconnected from the gate control, and the output of the gates, suitably filtered, must be applied to the gate control. If, during the transition from searching to tracking, the voltage at the gate control changes or is lost, for example, if said signal were removed entirely, the output of the gates would not produce a tracking signal and the object signal would be lost. Thus, it may be seen that the control voltage applied to the gate control must be maintained substantially constant during the transition from search to track.

This invention discloses a method whereby the voltage applied to the control system may be maintained substantially constant during the transition from the search operation to the track operation. Briefly, this is accomplished by utilizing a capacitance across the input of a circuit which feeds the gate control, said capacitance being charged from the external signal source during the search operation. When an object signal appears and deenergizes the external signal source, the charge still remains on the capacitance, thus retaining the gates in the correct position to pick up the object signal during the transition period.

This invention further discloses the use of an electron-discharge device for disabling the capacitance-charging circuit upon the location of an object signal with the result that extremely rapid disabling action may be accomplished. This is important where high search rates are used since, if the searching signal were not rapidly disconnected, the external searching signal would carry the gate control beyond the object signal before the searching signal was disabled and, hence, the object signal would be lost.

Other and further objects of this invention will be apparent as the description thereof progresses, reference being had to the accompanying drawing, wherein:

The single figure illustrates a partial functional flow diagram and partial schematic diagram of a system embodying this invention.

Referring now to the drawing, there is shown a transmitter 1 periodically energized by pulses from a keyer 2. Transmitter 1 feeds pulses of a high-frequency energy through a wave guide 3, a duplexer 4 and a wave guide 5 to a directive antenna 6. The antenna 6 radiates the high-frequency energy into space, and receives pulses of the radiated energy which are reflected by objects in space. These reflected-energy pulses which may be termed object signals are fed from the antenna 6 through wave guide 5 and duplexer 4 to a wave guide 7 which feeds these pulses to a receiver 8.

Receiver 8 may be, for example, a standard pulse-radar receiver, the output of which is a video or detected high-frequency signal. The output of receiver 8 is fed to a pair of gates 9 and 10 which may be termed early gate and late gate, respectively. These gates may be of any desired type, for example, a pentode amplifier which is rendered conductive during the gate period by the application of proper potentials to the electrodes, and is rendered nonconductive during the non-gated period, for example, by lowering the potential from the screen or suppressor grids.

The period during which the gates are rendered nonconductive is determined in the following manner. Keyer 2 feeds a pulse through a precision delay circuit 11 simultaneously with each pulse fed to transmitter 1. Precision delay circuit 11 delays the pulse from keyer 2 by a predetermined amount dependent on the potential applied to precision delay circuit 11. By varying said potential, the duration of the time delay may be varied. Precision delay circuit 11 may be, for example, any of the well-known variable delays such as the well-known phantastron circuit. Such a circuit is illustrated and described on page 197 of vol. 19 of the Radiation Lab. Series, entitled "Waveforms," published 1949 by McGraw-Hill Book Company. The output of precision delay circuit 11 is fed to a gate generator 12 which generates a gate pulse of a predetermined duration, for example, a fraction of a microsecond whenever it is triggered by the pulse from the precision delay circuit 11.

The pulse generated by gate generator 12 is fed to the early gate 9, for example, to the screen or suppressor grids thereof to render the tube of gate 9 conductive during the application of the pulse from gate generator 12, thus allowing video information to pass through the gate 9 during application thereto of the pulse from gate generator 12. The output of gate generator 12 is also fed through a delay line 13 having very short time delay of, for example, a fraction of a microsecond to gate generator 14. The output of gate generator 14 which is substantially similar to that of gate generator 12 is used to turn on or gate the late gate 10, thus allowing video information to pass therethrough. The output of early gate 9 is fed through a pulse stretcher 15 which smooths out the pulses from gate 9 to produce a substantially continuous signal. Pulse stretcher 15 may be, for example, substantially a peak detector. The output of late gate 10 is fed through a pulse stretcher 16 similar to pulse stretcher 15.

The outputs of pulse stretchers 15 and 16 are fed to a difference amplifier 17 which may be, for example, a pair of grid-controlled vacuum-discharge devices connected, in series, with the plate of one connected to the cathode of the other. The remaining cathode and plate are connected to negative and positive potentials, respectively, so that in the absence of signals in gates 9 and 10, the potential of the junction at the cathode and plate of the tubes, at which the output signal appears, is substantially at ground potential. The output of difference amplifier 17 is fed through a filter network comprising a resistor 18 and a condenser 19 to the grid 20 of a cathode-follower amplifier tube 21. The plate 22 of cathode follower 21 is connected to B+, and the cathode 23 thereof is connected through a potentiometer 24 and a resistor 25 to a source of negative potential. The variable tap 26 of potentiometer 24 is connected through a resistor 27 to the grid 28 of a pentode 29 which comprises part of an integrating circuit utilizing the Miller effect. The cathode 30 and suppressor grid 31 of tube 29 are grounded. The screen grid 32 of tube 29 is connected through a voltage-dropping resistor 33 to B+ and through a bleeder resistor 34 to ground. Plate 35 of tube 29 is connected through a plate-load resistor 36 to B+ and to the grid 37 of a cathode-follower amplifier tube 38. The plate 39 of amplifier 38 is connected to B+, and the cathode 40 thereof is connected through a cathode-load resistor 41 to ground. The cathode 40 is also connected through a condenser 42 to the grid 28 of tube 29, thus completing a feed-back path between the plate 35 of tube 29 and the grid 28 thereof through a circuit utilizing a capacitance. This reflects a capacitance back in parallel with the grid circuit, the value of said reflected capacitance being equal to the capacitance of condenser 42 multiplied by one plus the gain of tube 29.

Grid 28 is also connected to the cathode 43 of a gaseous-discharge device 44. The plate 45 of the gaseous-discharge device 44 is connected to the cathode 40 of cathode follower 38. The grid 46 of gaseous-discharge device 44 is connected to the tap 47 of a potentiometer 48. One end of potentiometer 48 is grounded, and the other end thereof is connected through a resistor 49 to a source of negative potential.

In the absence of a signal, the devices 44, 29, and 38, and their associated circuits constitute a saw-tooth generator whose operation is described in greater detail in my copending application, Serial No. 188,426, filed October 4, 1950, now U.S. Patent No. 2,662,981. Upon the arrival of an object signal in either of the early or late gates 9 and 10, the saw-tooth generator is deenergized in the following manner. Outputs of early and late gates 9 and 10 are fed through a mixer detector 50 and a stretcher 51 to the grid 52 of a triode 53. Mixer detector 50 may be, for example, two vacuum-discharge devices having their inputs connected, respectively, to the gates 9 and 10, and their outputs connected to a common cathode load. A suitable filter network is placed at the common load to lengthen the periodic pulses from gates 9 and 10 into a substantially continuous signal. This action is further carried out in stretcher 51 which may be, for example, a peak detector of any desired well-known type. The plate 54 of tube 53 is connected to B+, and the cathode 55 thereof is connected through a potentiometer 56 and a resistor 57 to a negative potential source. Variable tap 58 of potentiometer 56 is connected through a resistor 59 to the cathode 60 of a diode 61. The plate 62 of diode 61 is connected to the grid 28 of discharge device 29. In order for the discharge devices 44, 29 and 38 to operate as a saw-tooth generator, the condenser 42 must charge through the diode 61 and resistor 59.

Upon the presence of a signal in either of the gates 9 or 10, the signal is fed through mixer detector 50 and stretcher 51 to produce a positive voltage at grid 52 which causes tube 53 to conduct heavily, thus raising the potential of tap 58, and hence, cathode 60 to a positive value, which is higher than the potential of grid 28. Since cathode 60 is now positive with respect to plate 62, the diode 61 will not conduct. Hence, condenser 42 can charge no further through this circuit. Under these conditions, the saw-tooth generator is disabled, and the condenser 42 must charge or discharge through the resistor 27, which is of substantially higher resistance than resistor 59, according to the voltage generated by the difference amplifier 17. Thus, it may be seen that the system automatically switches from searching operation to tracking operation upon the arrival of an object signal.

This completes the description of the particular species of the invention described herein. However, many modifications thereof will be apparent to persons skilled in the art without departing from the spirit and scope of this invention. For example, the search-track operation may be utilized with systems other than radars, for example, underwater sound systems.

Furthermore, other integrating circuits and saw-tooth generators could be used in place of those embodying tubes 44, 29 and 38, and the system could be used to switch between other operations than search and track. Therefore, it is desired that this invention be not limited to the particular details described herein, except as defined by the appended claims.

What is claimed is:

1. An echo ranging system having a control system comprising a wave-form generator means for producing a cyclically varying signal, a source of signals derived from echoes received by said echo ranging system, said generator means comprising an electron-discharge device adapted to amplify signals from said source having a control grid and a plate, a circuit comprising a capacitance connected between said grid and said plate, a circuit for charging said capacitance, means for producing a substantially constant signal in response to a signal from said source, and means including diode means for rapidly disabling said charging circuit in response to said substantially constant signal.

2. An echo ranging system having a control system comprising a servo loop comprising means for comparing input signals with a signal reference, means for controlling said comparing means in response to an output signal from said comparing means, said controlling means comprising an electron-discharge device having a control grid and a plate, a circuit comprising a capacitance connected between said grid and said plate, the output of said comparing means being connected to said grid through a high impedance, a circuit for charging said capacitance means for producing a substantially constant signal in response to a signal from said comparing means, and means including diode means for rapidly disabling said charging circuit in response to said substantially constant signal.

3. An echo ranging system comprising means for radiating signals, means for receiving reflected echo signals derived from said radiating signals, means for determining the elapsed time between the radiation of said signals and receipt of returned echo signals comprising a pair of gates actuated, respectively, at different control times following radiation of the signals, means for comparing the outputs of said gates to obtain a difference signal, means for controlling the elapsed time between the radiation of said signals and the actuation of said gates in response to the output of said comparing means, means for cyclically varying the time duration between the radiation of said signals and the actuation of said gates comprising an electron discharge device having a control grid and an anode, a circuit comprising a capacitance connected between said grid and said anode, a circuit for charging such capacitance, means for producing a substantially constant signal in response to the outputs of said gates, and electron means including diode means for rapidly disabling said charging circuit in response to said substantially constant signal.

(References on following page)

References Cited in the file of this patent

UNITED STATES PATENTS

| | | |
|---|---|---|
| 2,436,663 | Norgaard | Feb. 24, 1948 |
| 2,461,144 | Cook | Feb. 8, 1949 |
| 2,461,871 | Bass | Feb. 15, 1949 |
| 2,468,703 | Hammel | Apr. 26, 1949 |
| 2,516,356 | Tull et al. | July 25, 1950 |
| 2,517,540 | Busignies | Aug. 8, 1950 |
| 2,538,027 | Mozley et al. | Feb. 27, 1951 |
| 2,543,072 | Stearns | Feb. 27, 1951 |
| 2,737,652 | White et al. | Mar. 6, 1956 |

OTHER REFERENCES

Textbook of Radar, Staff of Radio Physics Laboratory Council for Scientific and Industrial Research, Australia, Angus and Robertson, Sydney, 1947, pp. 484 to 506.

Burgmann: Inst. of Electrical Engineering, vol. 46, part III, No. 43, September 1949, pp. 395 to 402.